UNITED STATES PATENT OFFICE.

RICHARD G. A. WITT, OF MINNEAPOLIS, MINNESOTA, ASSIGNOR OF ONE-HALF TO FRITZ L. REIMAN, OF SAME PLACE.

PROCESS OF MANUFACTURING GLASS GLOBES.

SPECIFICATION forming part of Letters Patent No. 373,117, dated November 15, 1887.

Application filed June 1, 1886. Serial No. 203,878. (No model.)

*To all whom it may concern:*

Be it known that I, RICHARD G. A. WITT, a citizen of the United States, residing at Minneapolis, county of Hennepin, State of Minnesota, have invented a new and useful Improvement in the Process of Manufacturing Glass Globes, and a new and useful Improved Glass Globe, of which the following is a specification.

My invention has for its object to produce large glass globes of superior qualities with a great saving of labor and expense and with great rapidity.

Before my invention glass globes were made by hand-blowing, just as are made most other articles of glassware; but by that method there is a limit in size beyond which it is impossible for the most expert glass-blowers to produce a good globe. Attempts to make large globes—such as would be of a size suitable for arc electric lights, street gas-lights, &c.—were failures, resulting always in a globe of imperfect shape, of unequal division of the glass, and of imperfect luster, the large globe always being of much less brilliancy. For such globes there was little demand, because of their imperfections and lack of beauty. Attempts were also made to produce a good large globe by casting and blowing it in a tight mold, the same as fruit-jars are generally made. With the single exception of greater perfection or symmetry of form, this method resulted in like failure, producing a globe with all the defects (saving better form) of the hand-blown globe and the additional and radical defect of one or more large seams and lack of luster. This was the state of the art when I made my invention, and I made it for the purpose of overcoming these difficulties and producing a globe of any size, perfect in form, division, and luster. I accomplish this result by the following means:

First. A small body of glass metal is gathered on the blow-pipe and is hand-blown and formed to approximately globe shape, and by blowing slightly, marvering on the marver, and blocking on the hand-block and spoon. By this step a miniature globe of the exact design and of equal division throughout is obtained, which I use as a shell or foundation for the next step.

Second. This small globe, attached to the blow-pipe, is placed back into the crucible and a large body of glass metal is gathered over one-half or two-thirds of it, and the whole is then taken out and blown slightly and hand-blocked on a dampened large hand-block and spoon, particular care being taken to sharply define the annular convexities for the desired rims or lips, the whole thus being brought in a few seconds—before the metal has chilled—to approximately globe shape and the desired design. In gathering the additional metal over the miniature globe, shell, or core care is taken not to cover the shell. The new metal is taken on the outer half or two-thirds of the shell; otherwise the whole body of metal cannot be successfully worked.

Third. The metal is then placed within a dampened wooden mold, the two parts of which are quickly and tightly closed by an attendant boy, who at the same time places and holds a cap-board having a slot for inclosing the blow-pipe over the orifice of the mold. The glass-blower rapidly revolves the metal in the mold, blowing in it at the same time, and in an instant the globe is made. All of this is done in less time than it takes to read this description. The globe comes from the mold in the form shown in Fig. 1 of the drawings.

Fourth. The globe is annealed in the annealing-oven.

Fifth. A hot iron ring of size to fit the caps is then applied and a section cracked off from the top and bottom, leaving openings of proper size, and the globe is complete.

The novel parts of this process are steps one, two, and three, and the radically new features are three—viz., the miniature hand-blown globe as a shell or foundation around which to gather additional metal and form the globe; second, the outline formation of all the sharply-curved annular convexities for the required rims, lips, &c., before applying the third step; and, third, in revolving and blowing the glass metal as thus prepared by steps one and two in a dampened wooden mold, whereby the glass globe is completed in a single operation. Steps one and two are essential to the success of step three. Metal cannot be taken from the crucible and be placed immediately in the mold and a globe be thereby made. This has been repeatedly tried and failed. Neither will steps two and three succeed without step one. A sufficient quantity of metal cannot be taken from the crucible in the first instance and be manipulated as described in step two and be finished at once in the mold for two reasons: first, because the workman could not without step one bring so large a quantity of metal to approximate globe shape and the required design, and, second, because, even if the globe desired be a small one the metal will have become so chilled and cooled down that it would be shattered to fragments the instant that it was introduced into the mold. The miniature globe formed by step one is essential as a shell or foundation for the required globe, and enables the workman after more metal is added to bring the whole mass to the lines of an enlarged scale of the miniature shell and to complete step two in a few seconds while the metal is still hot. In such condition it may be placed in the mold and the globe be readily completed. In virtue of the preparatory manipulation by steps one and two the glass metal when introduced into the mold and blown, as described, fills into all the concavities of the mold, no difference how sharp the curves may be, and makes these convexities on the globe of equal division with the body of the globe. This is a result desirable for many reasons, and, among others, it enables the caps to be cracked off by step five on the section-line desired, which would be otherwise impossible on account of the greater thickness of the glass at that point.

The globes are made by this process with great rapidity and great cheapness. Two men and one boy will turn out nearly twice as many globes (with all their superior qualities) as did four men and two boys by the old hand-blown process, and, as there is no reheating after sufficient glass is gathered on the blow-pipe—i. e., after the second step—the expense of the oil glory-hole is saved.

The large globe made by this process is unique in its qualities, and may be readily distinguished from all large globes made in any other way. One of its distinguishing qualities, of high value, is the equal division of the glass. The glass is of equal thickness throughout. Another quality secured is the high degree of luster. The globe is notable for its brilliancy. A third feature is its perfection of form. It is a perfect globe, symmetrical and exact in all its lines. A fourth quality is its freedom from seams. There is not a seam nor lump in it. The first, second, and third qualities distinguish my globe from all large hand-blown globes. The first, second, and fourth qualities distinguish it from all globes cast in metal molds, all pressed-glass work, and all globes made in any kind of molds by any process different from mine. Taken together, its four qualities brand it and distinguish it as a distinct and unique article of manufacture.

So markedly superior is this globe that it is crowding all others out of the market, and since I invented it almost the entire force of a large manufactory have been employed solely on its manufacture, and glass-manufacturers from all over the United States have come to see how it is made. The mold herein disclosed is also my invention, and I hereby reserve the right to make application for Letters Patent thereon in another application.

What I claim, and desire to secure by Letters Patent of the United States in this application, is as follows:

The process herein disclosed for the manufacture of glass globes and other similar articles, consisting in gathering a small body of glass metal and hand-blowing and hand-forming a miniature globe shell or core, gathering over the outer end portion of this shell sufficient additional glass metal for the article desired, and outline forming and hand-blowing this whole mass approximately to the desired design, care being taken to roughly form thereon any convexities required for rims or lips on the finished article, revolving and simultaneously blowing the metal thus previously prepared and partially formed in a dampened wooden mold, substantially as described.

RICHARD G. A. WITT.

Witnesses:
JOSEPH A. PFEIFFER,
FRITZ L. REIMAN.